J. T. BESSENT.
APPARATUS FOR SEPARATING TURPENTINE FROM DROSS.
APPLICATION FILED JUNE 19, 1914.
1,115,379.
Patented Oct. 27, 1914.
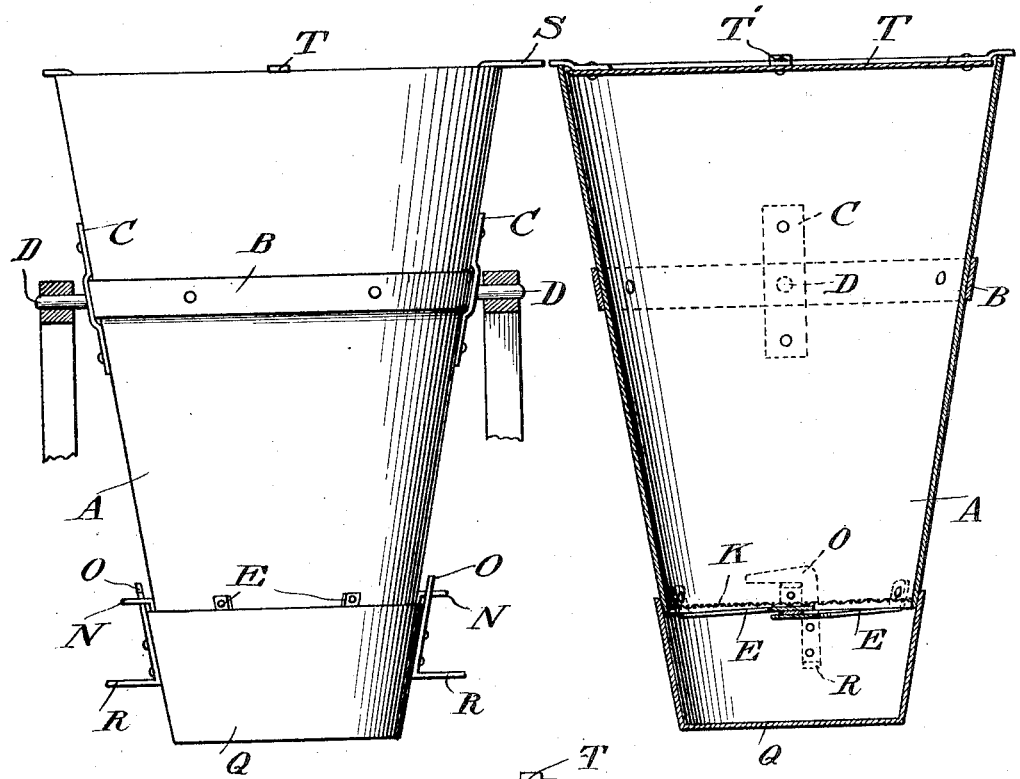

UNITED STATES PATENT OFFICE.

JAMES T. BESSENT, OF WARWICK, GEORGIA.

APPARATUS FOR SEPARATING TURPENTINE FROM DROSS.

1,115,379.  Specification of Letters Patent.  Patented Oct. 27, 1914.

Application filed June 19, 1914. Serial No. 846,163.

*To all whom it may concern:*

Be it known that I, JAMES T. BESSENT, a citizen of the United States, residing at Warwick, in the county of Worth and State of Georgia, have invented certain new and useful Improvements in Apparatus for Separating Turpentine from Dross; and I do hereby declare the following to be a full, clear, and exact description of the invention, such will enable others skilled in the art to which it appertains to make and use the same, reference being had to the accompanying drawings, and to the letters and figures of reference marked thereon, which form a part of this specification.

This invention relates to new and useful improvements in devices for separating dross from rosin and comprises a simple and efficient device of this nature having various details of construction, combinations and arrangements of parts which will be hereinafter fully described, shown in the accompanying drawings and then specifically defined in the appended claims.

My invention is illustrated in the accompanying drawings, in which:—

Figure 1 is a side elevation of the invention. Fig. 2 is a cross sectional view, and Fig. 3 is a top plan view.

Reference now being had to the details of the drawings by letter, A designates the receptacle which is tapering as shown and has a band B surrounding the same at any suitable location, said band being held in place by the metallic straps C. Stub shafts D project from said band at points diametrically opposite and form means whereby the receptacle may be supported in any suitable manner and allowed to tilt. The bottom of the receptacle is provided with intersecting cross bars E, forming a support for a loosely mounted screen K adapted to prevent the dross from passing through the bottom of the receptacle. The opposite end of one of said bars projects beyond the receptacle and forms hooks for engagement with the oppositely bent bars O which are fastened at points diametrically opposite upon the circumference of the cup Q, which is tapered to conform to the taper of the receptacle. The bars O have their lower ends outwardly bent, forming handles R. A lid or closure T is provided with lugs T' projecting therefrom which, with the handle S also fastened to the closure, form means for supporting the lid, as shown clearly in the top plan view of the drawings.

In operation, the cup is adjusted in place with the angled ends of the bars engaging said ends N and the liquid rosin and dross emptied in the top of the receptacle. The rosin in a molten state may readily pass through the screen into the cup beneath where the dross is retained by the screen and, after the rosin is separated therefrom, may be removed by inverting or turning the receptacle upon its pintles of stub shafts.

What I claim to be new is:—

1. An apparatus for separating dross from rosin consisting of a tapering receptacle having its lower end open, crosspieces projecting across said open end, a screen resting upon said crosspieces, a cup telescoping over the bottom of the receptacle, angled bars upon said cup, and lugs projecting from the receptacle and engaged by said bars.

2. An apparatus for separating dross from rosin consisting of a tapering receptacle with an open bottom, a band surrounding the receptacle, straps secured to the latter and engaging said band, stub shafts projecting from said band and passing through said straps, designed to form supports for the receptacle, crosspieces intersecting the exit end of the receptacle, a screen supported upon the crosspieces, a cup telescoping over the lower end of the receptacle, angled bars fastened to the cup and engaging projecting ends of said screen supporting bars, and a closure for the receptacle.

In testimony whereof I hereunto affix my signature in presence of two witnesses.

JAMES T. BESSENT.

Witnesses:
C. R. GOODMAN,
B. T. HARRIS.

---

Copies of this patent may be obtained for five cents each, by addressing the "Commissioner of Patents, Washington, D. C."